United States Patent [19]

Rzeszewski

[11] 4,424,533
[45] Jan. 3, 1984

[54] PHASE DISTORTION DETECTION CIRCUITRY FOR LOW COST AUTOMATIC EQUALIZER

[75] Inventor: Theodore S. Rzeszewski, Lombard, Ill.

[73] Assignee: Matsushita Electric Industrial Co., Ltd., Osaka, Japan

[21] Appl. No.: 306,967

[22] Filed: Sep. 30, 1981

Related U.S. Application Data

[63] Continuation-in-part of Ser. No. 282,039, Jul. 10, 1981, abandoned.

[51] Int. Cl.³ .............................................. H04N 5/31
[52] U.S. Cl. .................................... 358/167; 358/35; 358/139; 358/10
[58] Field of Search ................... 358/35, 10, 139, 153, 358/160, 167, 187; 455/304, 305

[56] References Cited

U.S. PATENT DOCUMENTS

| | | |
|---|---|---|
| 3,334,301 | 8/1967 | Sarkany et al. ....................... 358/35 |
| 3,911,478 | 10/1975 | Rhodes ................................. 358/35 |
| 4,044,381 | 8/1977 | Shimano et al. ..................... 358/160 |
| 4,127,874 | 11/1978 | Iwasawa et al. ..................... 358/167 |
| 4,128,848 | 12/1978 | Nakagawa ........................... 358/167 |

OTHER PUBLICATIONS

Schmid, "The Measurement of Linear Chroma Distortion in NTSC TV Facilities, " *IEEE Transactions on Broadcasting,* vol. BC-18, No. 3, Sep. 1972, pp. 77-80.

*Primary Examiner*—Richard Murray

[57] ABSTRACT

A system for detecting phase distortion in video signals due to multipath effects includes circuitry for extracting the high and low frequency content of a horizontal synchronization signal, and for comparing the phase of the high frequency content to the low frequency content to produce a signal indicative of phase distortion in the video signal. The phase distortion signal may be applied to distortion reduction circuitry, and specifically in a three tap delay line equalizer, to reduce phase distortion in the video signal.

23 Claims, 14 Drawing Figures

PHASE DISTORTION DETECTION CIRCUITRY FOR LOW COST AUTOMATIC EQUALIZER

This is a continuation-in-part application based upon the commonly assigned co-pending U.S. patent application Ser. No. 282,039, entitled "Low Cost Automatic Equalizer", by Theodore S. Rzeszewski, filed July 10, 1981, the entire disclosure of which is hereby incorporated by reference.

DESCRIPTION OF THE INVENTION

The present invention relates to a technique for detecting phase distortion in a video signal which can be used to automatically compensate for waveform distortion in a transmitted television or teletext signal.

A transmitted television or teletext signal waveform may undergo distortion due to the characteristics of the propagation path of the signal from the transmitter to the television or teletext receiver. One type of distortion, called "multipath" distortion, may be due to reflection of the signal by buildings or mountains, or impedance mismatches between the receiving antenna and cable or between the cables and the television or teletext receiver.

The multipath phenomenon may result in what is known as "close-in" echoes. The close-in echoes produce amplitude and phase distortion of the television or teletext signals which may result in a fuzzy or unclear picture due to overshoot, smearing or ringing in the video waveform, or loss of the teletext data. Multipath distortion may also produce "far-out" echoes which produce a ghost-like appearance in the received video.

One approach to compensating for the distortion in the video waveform caused by close-in and far-out echoes is to provide a transversal filter employed as a waveform equalizer. The transversal filter is usually comprised of a delay circuit usually having a large number of delay elements (on the order of 20) in series, each one delaying the video signals by T seconds. A plurality of amplitude and polarity adjusting circuits are provided for each delay element for independently adjusting the amplitude and polarity of the outputs from the individual delay elements. An adder circuit is provided for adding the outputs of the adjusting circuits. When the amplitude and polarity circuits are properly controlled, the output of the adder circuit will be substantially free from the close-in or far-out echoes.

Several techniques for controlling the amplitude and polarity adjusting circuits have been proposed. For example, U.S. Pat. No. 4,044,381 to Shimano et al. relies upon the existence of a signal, such as the horizontal or vertical synchronization signal, which has a known constant waveform prior to transmission thereof. The signal having the constant waveform is compared with a reference signal having a waveform which is the same as that of the known constant waveform, prior to transmission, such that upon comparison of the two signals, the distortion of the waveform produced in transmission may be determined by detecting differences between the two. The detected distortion is utilized for controlling the amplitude and polarity adjusting circuits in the transversal filter.

Another technique, such as taught by Iwasawa et al., U.S. Pat. No. 4,127,874, detects variations in a unit step-like signal including in the transmitted video signal, such as the vertical synchronization pulse. Ideally, the synchronization pulse has a constant amplitude, but when distortion has occurred, the amplitude of the synchronization pulse varies with time. The pulse is examined and sampled at a high rate, and each sampled value is compared with a subsequent sampled value. When these samples have different levels, indicating that distortion has occurred, the output of the sampling section provides phase and amplitude information by which the adjustment circuitry may be controlled.

Both of these prior art techniques for controlling the amplitude and polarity adjustment circuits for each of the individual taps requires extremely complicated and expensive circuitry, therefore limiting the use of such echo cancellers to very expensive receivers.

Since the far-out echoes are produced by long time delays between the original signal and the echo, the elimination of the far-out echoes requires the use of a transversal filter having a long time delay circuit and a large number of taps, which therefore requires the complex control circuitry employed in the prior art systems. However, it has been found that of the two, it is the close-in echoes which produce the most undesirable distortion of the television or teletext signals. That is, as long as there are no close-in echoes, the television signal will produce a sharp and clear display, and the teletext data will be reliable. While the existence of a far-out echo in the video signal will produce a ghost-like image, viewers generally agree that the existence of the ghost does not detract from the image quality as seriously as the close-in echoes as long as the individual images are clear. Also, for teletext signals, the close-in echoes are far more detrimental than far-out echoes.

Unlike the far-out echoes, the close-in echoes are produced by short time delays between the original signal and the echo signal and thus require only a short time delay in the transversal filter. The distortion produced by the close-in echoes produces changes in both the amplitude and phase of the high frequency portions of the television or teletext signals relative to the low frequency portions of the video signals. Therefore, to cancel close-in echoes, the transversal filter must function to equalize the amplitude and phase of the high frequency portions of the television or teletext signal relative to the low frequencies of the television or teletext signals.

It is therefore an object of the present invention to provide phase distortion detection circuitry for detecting phase distortion in a television or teletext signal due to close-in echoes.

It is a more specific object of the invention to provide phase distortion detection circuitry, in a system for cancelling close-in echoes, which eliminates the complex circuitry heretofore necessary to detect and reduce phase distortion.

It is a further object of the present invention to provide a particular phase distortion detection circuit in distortion reduction circuitry for equalizing the amplitude and phase of the high frequency portions of the television or teletext signals relative to the low frequency portions of the television or teletext signals in order to cancel close-in echoes. Specifically, the present invention readily lends itself to use in distortion reduction circuitry having a three tap delay line for reducing the amount of distortion in a received television or teletext signal due to close-in echoes.

Briefly, a system provided for detecting phase distortion in video signals due to multi-path effects includes circuitry for providing a selected portion of the video signal having a predetermined phase relationship between high and low frequencies prior to transmission thereof, and circuitry for measuring the phase of the high frequencies relative to the low frequencies to thereby provide an indication of the phase distortion. Preferably, the selected portion of the video signal is a horizontal synchronization pulse.

More specifically, the phase distortion detection circuitry includes circuitry for separating from the selected portion of the video signal, a signal containing the high frequencies thereof, circuitry for developing timing signals relative to the selected portion of the video signal, and circuitry under the control of the timing signals responsive to a signal related to the separated high frequency signal which provides an indication of the phase distortion.

In accordance with a specific embodiment of the invention, the circuitry for developing the timing signals includes means for differentiating a signal related to the selected portion of the video signal to provide a differentiated signal. The differentiated signal is applied to timing means for providing precise timing signals. The circuitry responsive to the separated high frequency signal includes a gate controlled by the timing signals for selectively passing the signal related to the separted high frequencies and a low pass filter for receiving the high frequency signal and providing an output singal indicative of phase distortion. The circuitry may further include circuitry for adding the separated high frequencies and a delayed version thereof to produce the signal related to the separated high frequencies. Alternatively, the signal related to the separated high frequencies may be the separated high frequency signals themselves. Still further, the signal related to the portion of the video signal may be one of a low pass filtered version of the portion of the video signal, a delayed replica of the portion of the video signal, or the portion of the video signal itself.

The circuitry for separating the high frequencies from the selected portion of the video signal includes a low pass filter for filtering the selected portion of the video signal, and subtraction circuitry for subtracting the filtered signal from the selected portion of the video signal. Specifically, the filter may comprise a Gaussian-like low pass filter. The selected portion of the video signal may be delayed in a delay device prior to being applied to the subtraction circuitry to thereby compensate for a delay in the Gaussian-like low pass filter.

The phase distortion detection circuitry, in accordance with the present invention, finds particular utility when used in conjunction with the "Low Cost Automatic Equalizer" described in the above-mentioned co-pending patent application.

These and other objects and aspects of the invention will be discussed with reference to the following drawing figures of which:

Figure 9:
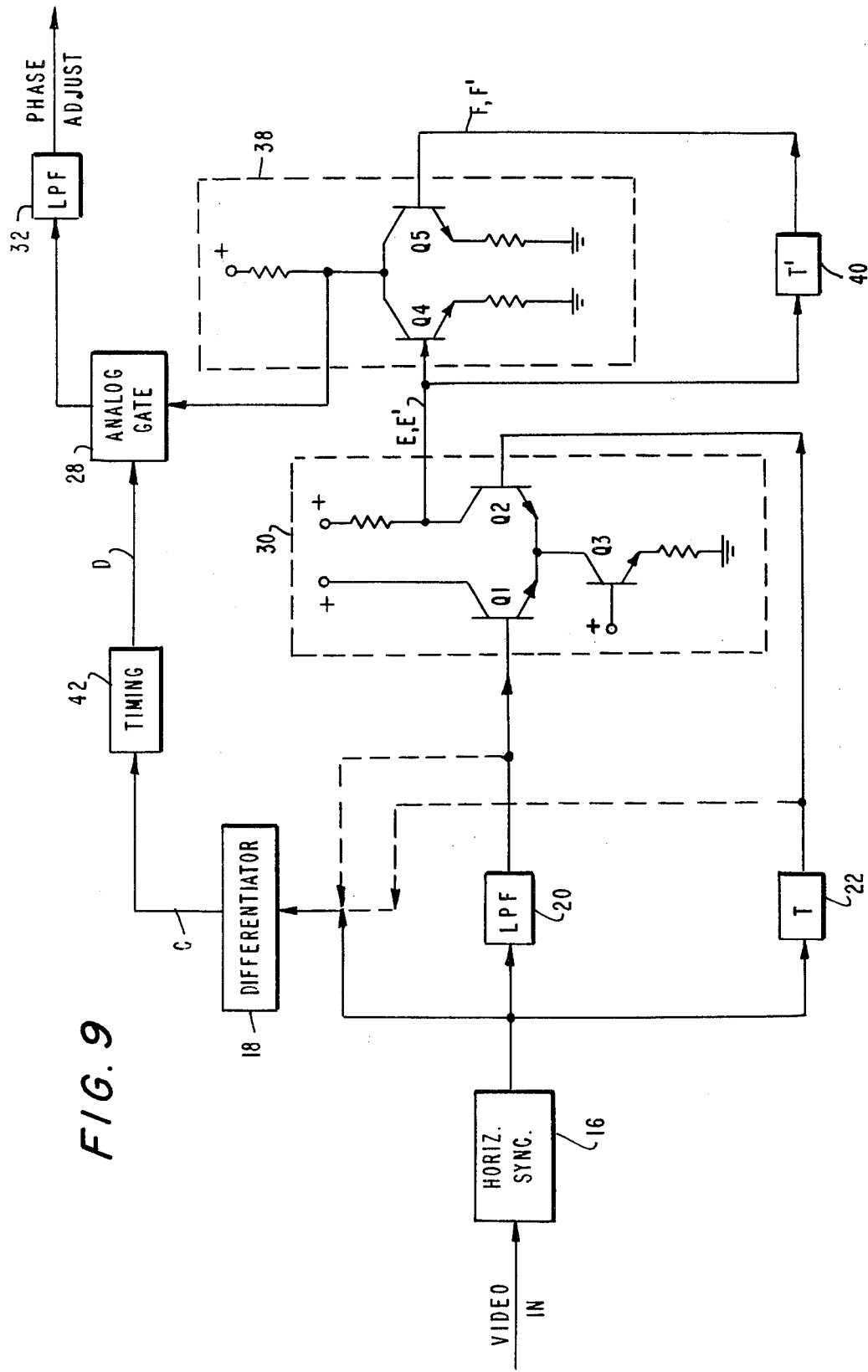
FIG. 9 is a schematic and block diagram of a second embodiment of the phase distortion detection circuitry which allows an increased range of phase distortion to be detected.
Figure 11:
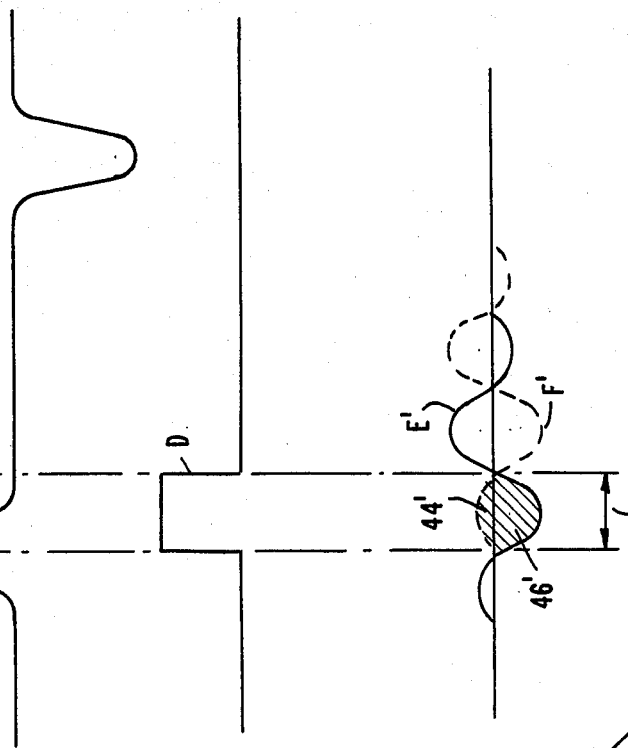
Figure 12:
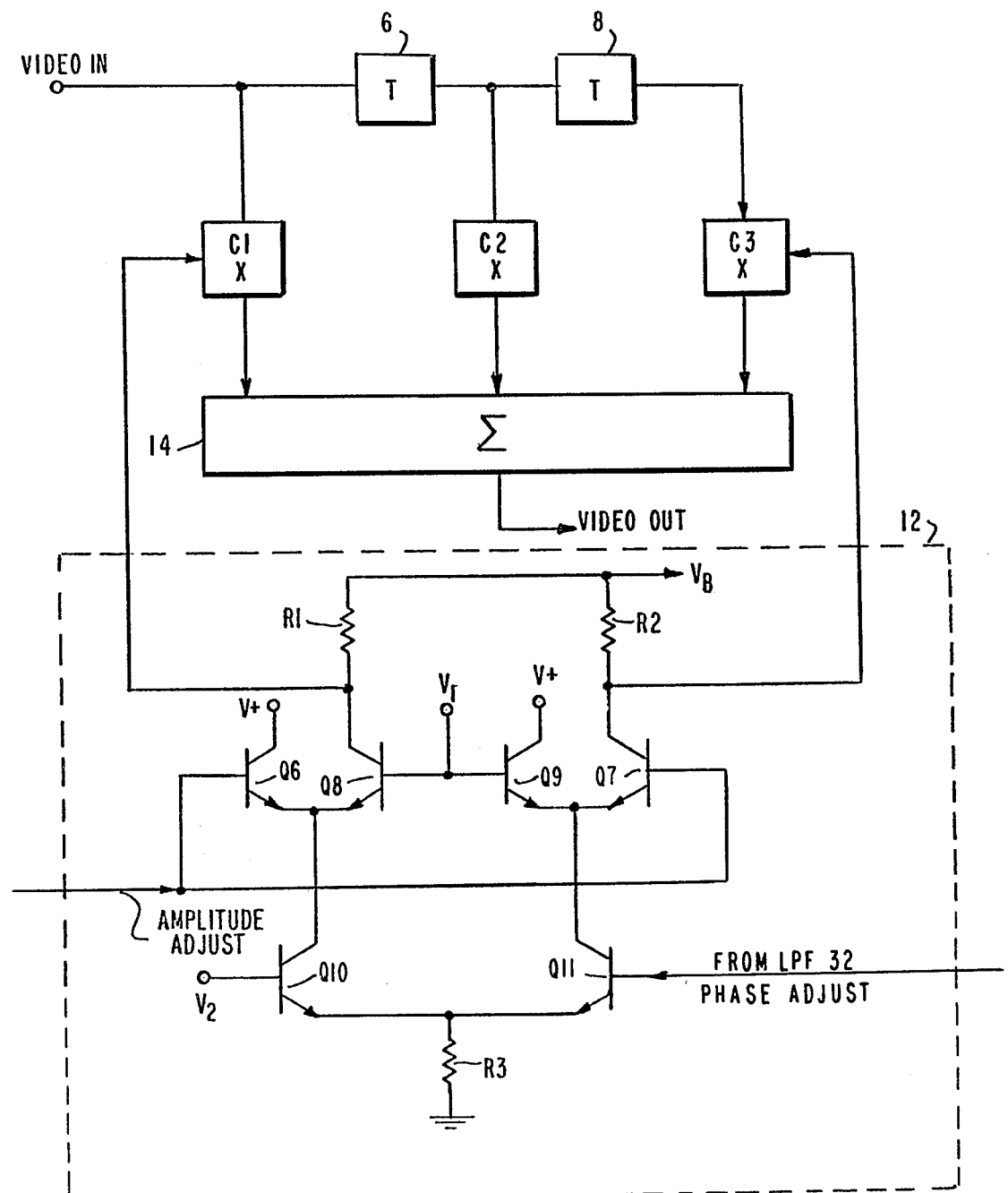

FIG. 11 is a waveform diagram illustrating the subsequent signal processing of the horizontal synchronization pulse performed by the circuitry of FIG. 9 for a highly phase distorted video signal; and FIG. 12 is a schematic diagram illustrating the three-tap delay line equalizer to which the output of the phase distortion detection circuitry may be applied in order to reduce phase distortion in received video signals.

It is to be understood that in the specification and in the claims, the term "video signal" shall encompass both television signals and teletext signals, the present invention being equally applicable to both.

Figure 1:
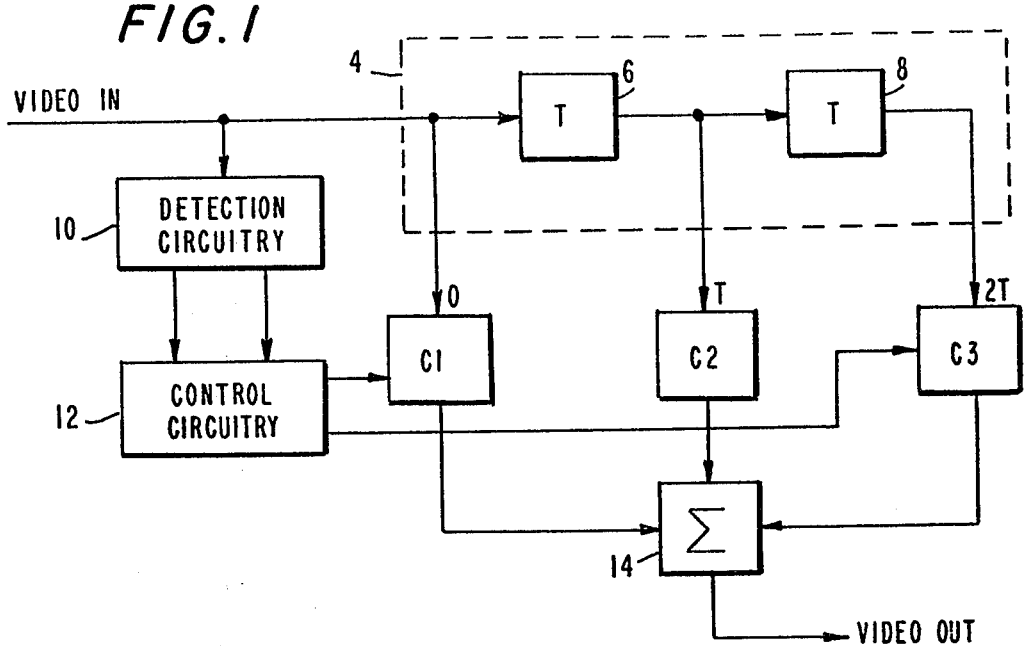
FIG. 1 is a block diagram of the system for reducing phase and amplitude distortion of television or teletext signals produced by close-in echoes, including a transversal filter, detection circuitry, and control circuitry.

FIG. 1 shows the distortion reduction circuitry in accordance with the invention. The distortion reduction circuitry is disposed in a television or teletext receiver and receives the incoming video signal at delay line 4 which has three taps providing relative delays of zero, T and 2T, as shown. The video signal is also applied to detection circuitry 10. The signal applied to delay line 4 is applied to delay element 6 and to adjustment circuit C1 by way of the zero delay tap. The output of delay element 6 is applied to delay element 8 and adjustment circuit C2 by way of the T delay tap. The output from delay circuitry 8 is applied to adjustment circuit C3 by way of the 2T delay tap. The adjustment circuits C1–C3 comprise amplifiers of well known construction and function to adjust the amplitude and polarity of the signals input thereto. The gain and polarity of circuits C1 and C3 are controlled by control circuitry 12, which receives a detection output from detection circuitry 10. The gain and polarity of circuit C2 is fixed. The outputs of the adjustment circuits C1–C3 are applied to adder 14, the output of which provides to the remaining portions of the television or teletext receiver a video signal which is substantially free from close-in echoes.

The nature of the distortion of the video signal due to close-in echoes must first be understood in order to appreciate the invention. The distortion produced by close-in echoes produces changes in both amplitude and phase of the high frequency portions of the video signals with respect to the low frequency portions of the video signal. More particularly, the higher frequency portions of the signal (frequencies around the color subcarrier of 3.58 MHz) tend to be attenuated relative to the lower frequency portions of the video signal, and further tend to be advanced to phase relative to the lower frequencies. Thus, by increasing the gain of the higher frequencies of the video signal relative to the lower frequencies and by delaying in time the higher frequencies relative to the lower frequencies, the video signal can be equalized to thereby reduce or eliminate close-in echoes.

Figure 2:
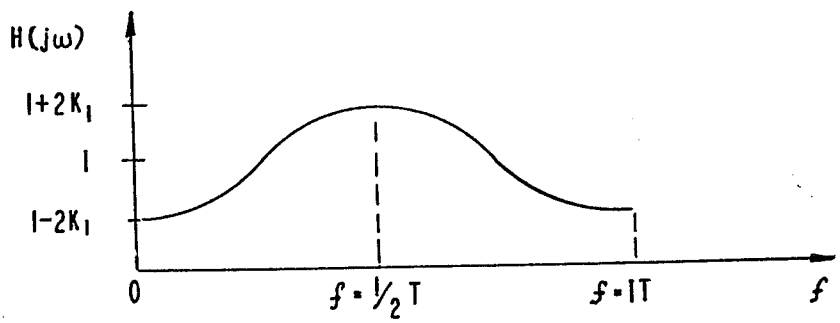
FIG. 2 is a graph illustrating the amplitude versus frequency response of the waveform equalizer of FIG. 1 when operated to reduce amplitude distortion.

This amplitude equalization may be achieved by providing adjustment circuit C2 with a unity gain and positive coefficient (the polarity of the output signal is identical to the polarity of the input signal), and by adjusting the amplification factor of circuits C1 and C3 together equally with a negative coefficient (the polarity of the output signal is opposite the polarity of the input signal), where the gains of circuits C1 and C3 are less than or equal to the gain of circuit C2. Under these conditions, the transfer function of the circuitry of FIG. 1 may be defined as:

$$H(j\omega T) = 1 - K_1(e^{j\omega T} + e^{-j\omega T}) = 1 - 2K_1 \cos \omega t, \quad (1)$$

where $-K_1 = C1 = C3$ is the amplification factor of adjustment circuits C1 and C3, and T is the time delay produced by each of delay elements 6 and 8. The magnitude variation of $H(j\omega)$ as a function of frequency is illustrated in FIG. 2. By inspecting Equation 1 and FIG. 2, it can be seen that since there is no imaginary term in $H(j\omega)$, there is no phase shift or phase distortion produced by the distortion reduction circuitry for amplitude equalization. Thus, the distortion reduction circuitry when operated in this manner emphasizes signals having frequencies of around $f = 1/2T$ without introducing phase distortion or shifting. The amplitude characteristic illustrated in FIG. 2 shows a sinusoidal response that varies between $1 - K_1$ and $1 + 2K_1$, in amplitude. When $\omega = 0$, the output is at the minimum, $1 - 2K_1$, and when $\omega = \pi/T (f = 1/2T)$, the filter provides the maximum amplitude of $1 + 2K_1$. The boost in amplitude of the high frequencies required to equalize the video signal may be produced by adjusting T such that the peak of the curve occurs at or near the high frequency edge of the luminance. In accordance with the present invention, the time delay T is chosen to be approximately 0.14 microseconds ($1/(2 \times 3.58 \text{ MHz})$) based on the color subcarrier frequency of 3.58 MHz.

Operation of the distortion reduction circuitry in the foregoing matter thereby allows an amplitude adjustment of the high frequencies in the signal relative to the lower frequencies to compensate for close-in echoes, the compensation producing no phase distortion when the coefficients C1 and C3 are adjusted identically.

Phase adjustments of the high frequency video relative to the low frequencies, on the other hand, require that the amplification of circuits C1 and C3 be adjusted with equal amplitude but opposite polarity. That is, by making $C1 = -C3 = -K_2$, the transversal filter is provided with the transfer function $$H(j\omega T) = 1 - K_2 e^{j\omega T} + K_2 e^{-j\omega T} = 1 - j2K_2 \sin \omega T. \quad (2)$$

Figure 3:
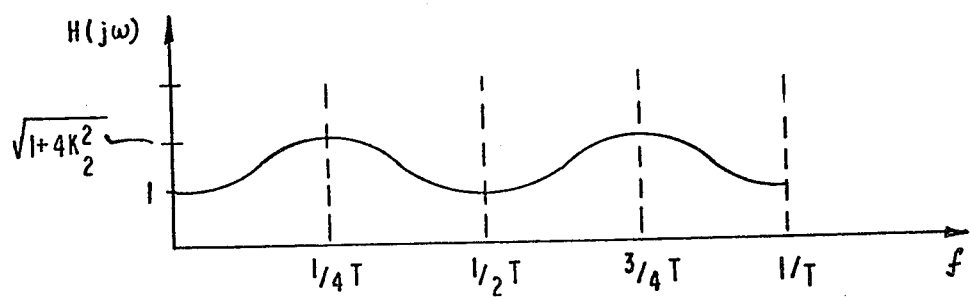
FIG. 3 is a graph illustrating the amplitude versus frequency response of the equalizer of FIG. 1 when operated to reduce phase distortion.

This transfer function provides both an amplitude and phase response as a function of frequency. The amplitude response is illustrated in FIG. 3 and may be specified by $$|H(j\omega)| = 1 + 4K_2^2 \sin^2 \omega T \quad (3)$$
$$= 1 + 2K_2^2 - 2K_2^2 \cos 2\omega T,$$

while the phase response is specified by $$\phi = \arctan(-2K_2 \sin \omega T). \quad (4)$$

Thus, by adjusting the coefficients C1 and C3 in an opposite sense, the phase response of the transversal filter may be varied in accordance with Equation 4. However, the phase adjustment in accordance with Equation 4 also produces a change in the amplitude characteristics of the distortion reduction circuitry in accordance with Equation 3. Fortunately, however, as shown in FIG. 3, the amplitude variation produced in accordance with Equation 3 is considerably less than the magnitude of that produced in accordance with Equation 1.

The time delay of the high frequencies relative to the lower frequencies produced by the phase response of Equation 4 may be estimated as follows. Working at the color subcarrier frequency of 3.58 MHz = 1/2T, the angular frequency $\omega$ is equal to $\pi/T$. Thus, $\sin \omega T - \sin \pi = 0$. Since the circuitry will be operating at or near 3.58 MHz, $\sin \omega T$ will be either 0 or a small value. For a small argument x, arctan x is approximately x. Since the absolute value of $K_2$ is less than or equal to 1, Equation 4 can be approximated by $$\phi \approx -2K_2 \sin \omega T \quad (5)$$

The time delay $t_d$ is equal to $d\phi/d\omega$. Therefore, $$t_d = d\phi/d\omega = -2K_2 T \cos \omega T. \quad (6)$$

Since the circuit will be operated near $\omega T = \pi$, $\cos \omega T$ is approximately $-1$. Thus, $$t_d \approx 2K_2 T \quad (7)$$

This illustrates that the primary effect of the phase adjustment is a time delay of the higher frequency portion of the video signal near 3.58 MHz relative to the lower frequencies. The amount of the delay can be adjusted by varying the value $K_2$, since 2T is constant.

Figure 4A:
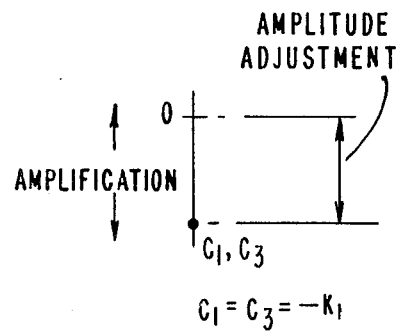
FIGS. 4a–4c are graphic illustrations helpful in understanding the operation of the waveform equalizer of FIG. 1 as an amplitude and phase reduction circuit.
Figure 4B:
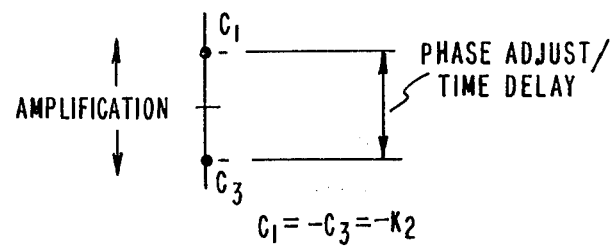
Figure 4C:
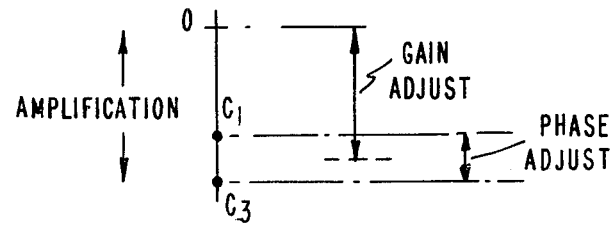

FIG. 4a illustrates the situation where the amplification of circuits C1 and C3 are adjusted equally with negative polarity. Adjusting circuits C1 and C3 in this manner provides amplitude equalization of the signal applied to the distortion reduction circuitry in accordance with Equation 1, the amplitude equalization producing no phase shift or phase distortion. FIG. 4b illustrates the situation where the amplification of circuits C1 and C3 is equal but of opposite polarity, to provide phase equalization in accordance with Equation 4. FIG. 4c illustrates the situation where the distortion reduction circuitry equalizes both the phase and gain of the video signal in accordance with both Equations 1 and 4. The relative amplification of circuits C1 and C3 for the phase adjustment is superimposed on the amplification provided for circuits C1 and C3 for the gain adjustment. That is, the phase adjustment is related to the difference in magnitude between coefficients C1 and C3, while the gain adjustment is a function the average of the magnitudes of coefficients C1 and C3 relative to zero. Again, the gain variation due to the phase adjustment in accordance with Equation 3 is not considered at this point since the gain adjustment in accordance with Equation 1 dominates.

The detail of detection circuitry 10 and control circuitry 12, FIG. 1, are fully disclosed and discussed in the above-cited co-pending U.S. patent application Ser. No. 282,039, the entire disclosure of which is hereby incorporated by reference. The phase distortion detection circuitry to be described with reference to FIGS. 5 through 11 herein, is located in detection circuitry 10 and is provided as an alternative to the technique of providing a phase distortion indication as described in the co-pending application.

Figure 5:
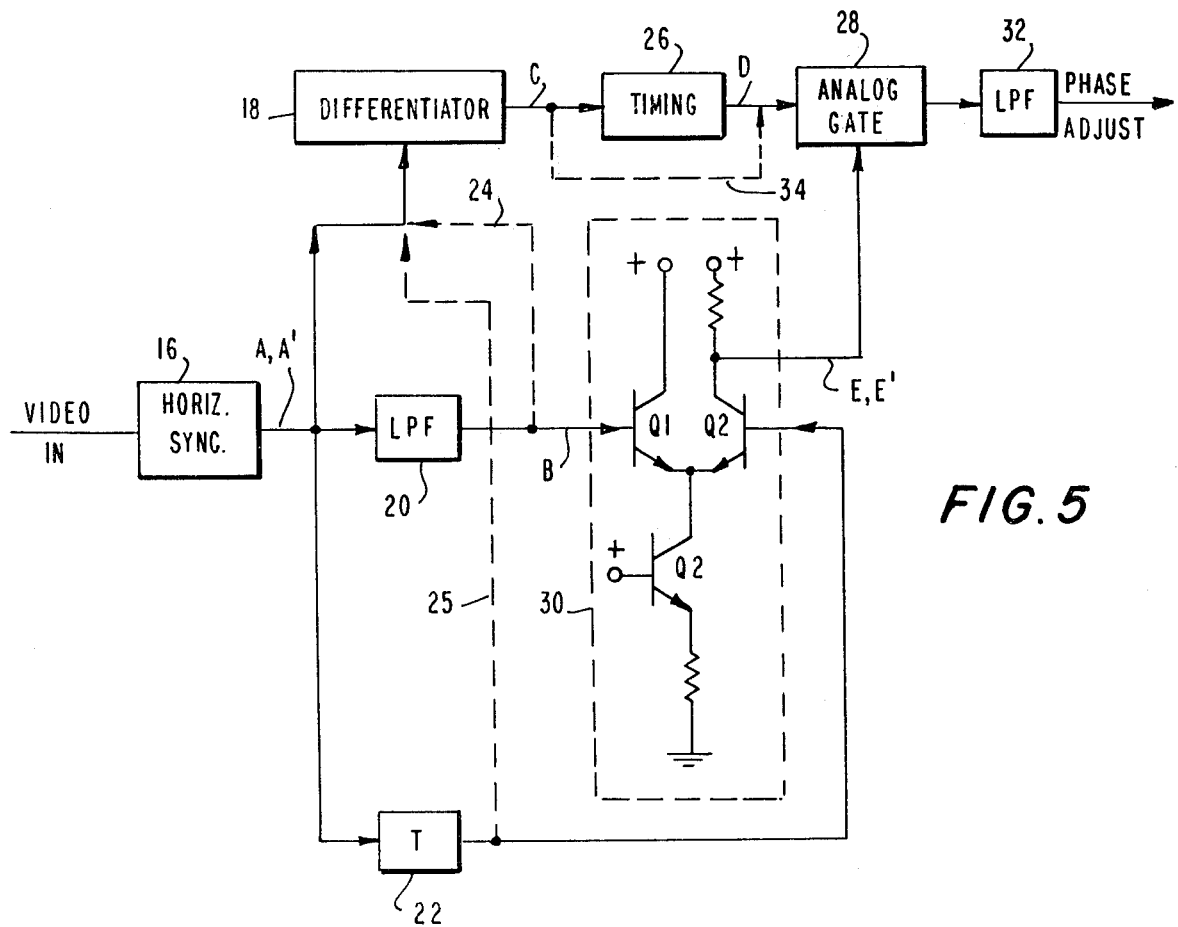
FIG. 5 is a schematic and block diagram of the phase distortion detection circuitry in accordance with a first embodiment of the present invention.

With reference to FIG. 5, the horizontal synchronization pulse in a received video signal is extracted in a well known manner in horizontal synchronization circuit 16. The horizontal synchronization pulse is applied to differentiator 18, low pass filter 20, and delay device 22. The differentiator 18 may alternatively receive inputs from low pass filter 20, as indicated by dashed line 24, or from delay device 22, as indicated by dashed line 25, rather than directly receiving the horizontal synchronization pulse from circuit 16. The output of the differentiator 18 is applied to timing circuitry 26, which in turn provides a gating signal to analog gate 28. Alternatively, analog gate 28 may directly receive the output of differentiator 18, as shown in dashed line 34. The outputs of low pass filter 20 and delay device 22 are applied to subtractor 30 which comprises common emitter NPN transistors Q1 and Q2, and NPN transistor Q3 having its collector coupled to the common emitters of transistors Q1 and Q2, its base connected to the positive supply voltage and its emitter delivered to ground by way of a resistor. The collectors of transistors Q1 and Q2 are applied to a positive supply voltage, collector of transistor Q2 applied thereto by way of a resistor. The output of subtractor 30, representing the high frequency content of the selected signal, taken directly from the collector of transistor Q2, is applied to the signal input of analog gate 28. The signal output of analog gate 28 is applied to low pass filter 32 which provides a signal indicative of the amount of phase distortion in the received video signal.

Operation of the phase distortion detection circuitry of FIG. 5 will now be discussed with further reference to FIGS. 6 and 7.

Figure 7:
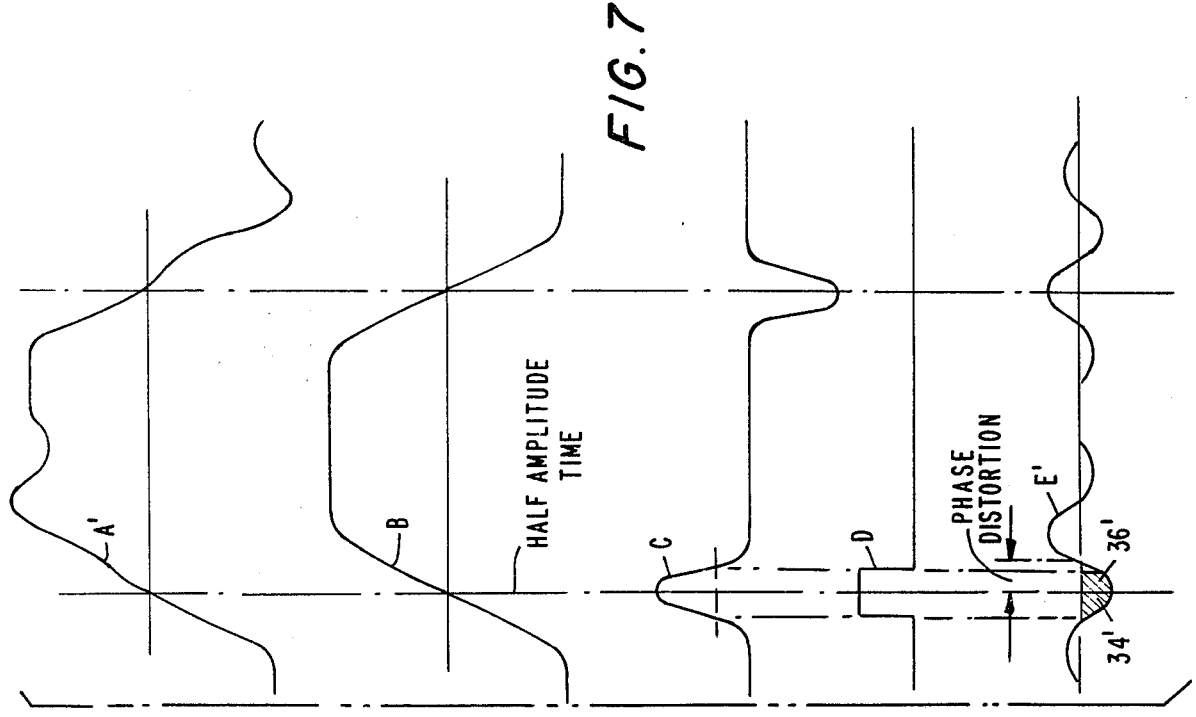
FIG. 7 is a waveform diagram illustrating the horizontal synchronization pulse and the subsequent processing thereof to produce a phase distortion indication where phase distortion of the video signal has occurred.
Figure 6:
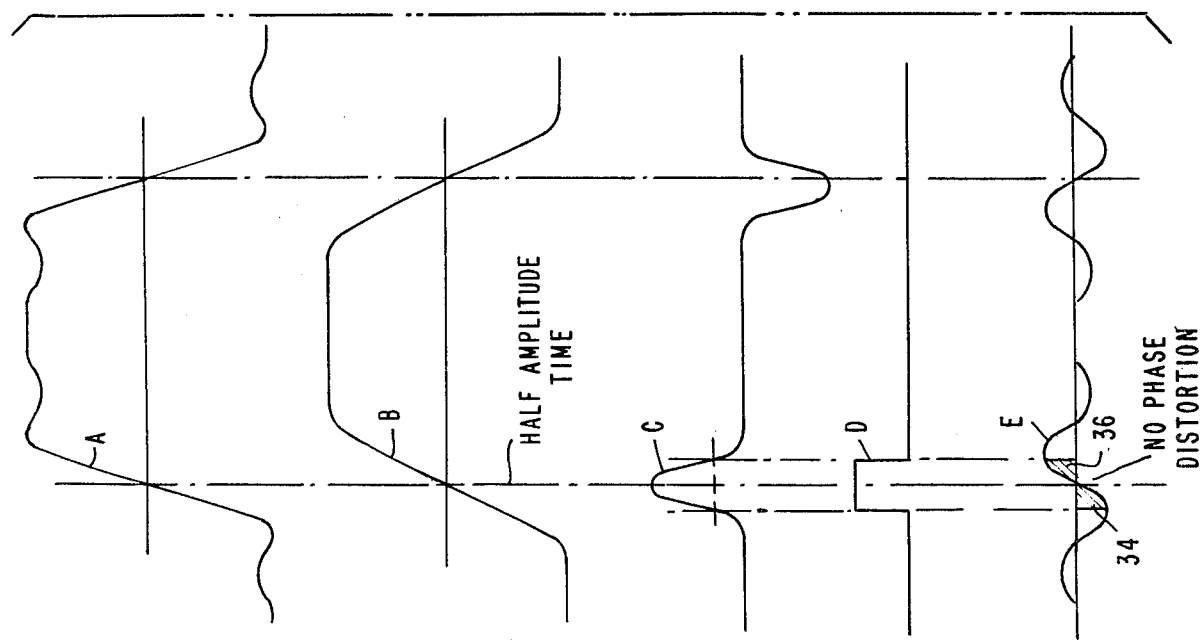
FIG. 6 is a waveform diagram illustrating a horizontal synchronization pulse and the subsequent processing thereof to produce a phase distortion indication where no phase distortion in the video signal has occurred.

The horizontal synchronization pulse will have the shape of waveform A, FIG. 6, if no phase distortion in the video signal has occurred, or will have a shape similar to that of waveform A', FIG. 7, if the received video signal has undergone phase distortion. That is, waveform A, FIG. 6, is a band limited approximation of a square wave pulse with the high and low frequencies being in phase, while waveform A' represents the same frequencies as the square wave approximation except that the high frequencies are phase advanced relative to the low frequencies in the signal, thus resulting in phase distortion. The low frequency content of the horizontal synchronization signal is extracted by applying waveform A or A' to low pass flter 20, which provides waveform B, FIGS. 6 and 7, in response thereto. Waveform B, FIGS. 6 and 7, will be substantially identical in shape and phase since the distortion produced by the higher frequencies leading the lower frequencies in phase is removed. Low pass filter 20 may be Gaussian-type low pass filter having a frequency cutoff at or around the color subcarrier frequency of 3.58 MHz, a nearly linear phase characteristic and an amplitude characteristic having a relatively moderate and monotonic amplitude versus frequency characteristic. However, filters having other characteristics may be used as will be apparent to those skilled in the art. Waveform B produced by low pass filter 20 is applied to the base of transistor Q1 in subtractor 30.

Waveform A or A' is also applied to differentiator or high pass filter 18 either directly or via filter 20 or delay element 22. Differentiator 18 acts to produce a pulse-type output during the rising and falling edges of the horizontal synchronization signal as illustrated by waveform C in FIGS. 6 and 7. Pulse-type signal C is closely centered at the time at which waveform B attains its half amplitude point ("half-amplitude time"). Pulse shaped curve C is applied to timing circuitry 26 which provides a square wave pulse D centered at the half-amplitude time of waveform B. The square wave pulse D is applied to the control input of gate 28 so that the signal from subtractor 30 is applied to low pass filter 32 when pulse D is present. Timing circuitry 26 may comprise one or more one shot circuits of well known contruction to provide precise centering of waveform D around the half amplitude time, or may simply be a bi stable device which changes state at a fixed voltage if it is found that the waveform C is highly symmetrical about the half-amplitude time. In fact, if it is found that waveform C is precisely centered on and symmetrical about the half-amplitude time, the waveform C may be applied directly to analog gate 28, as shown by dashed line 34, analog gate 28 turning on at a particular threshold switching voltage.

Horizontal synchronization pulse waveform A or A' is further applied to delay element 22 which provides a delay equal to the delay produced by low pass filter 20 to insure proper phase alignment between signals applied to subtractor 30. Waveform B is subtracted from waveform A or A' in subtractor 30 to produce waveform E or E', FIGS. 6 or 7, respectively, which represent the high frequency components of the pulse. When no phase distortion has occurred, as shown in FIG. 6, waveform E has odd symmetry with respect to the half-amplitude time, as illustrated by the equal negative and positive areas 34 and 36, and thus integrates to zero in low pass filter 32 when gated thereto. However, when phase distortion has occurred, as illustrated in FIG. 7, areas 34' and 36' are both negative during the gating interval and waveform E' integrates to a net negative voltage in low pass filter 32. The output of low pass filter 32 is applied to control circuitry 12, FIG. 1, in a manner to be described in detail below.

Figure 8:
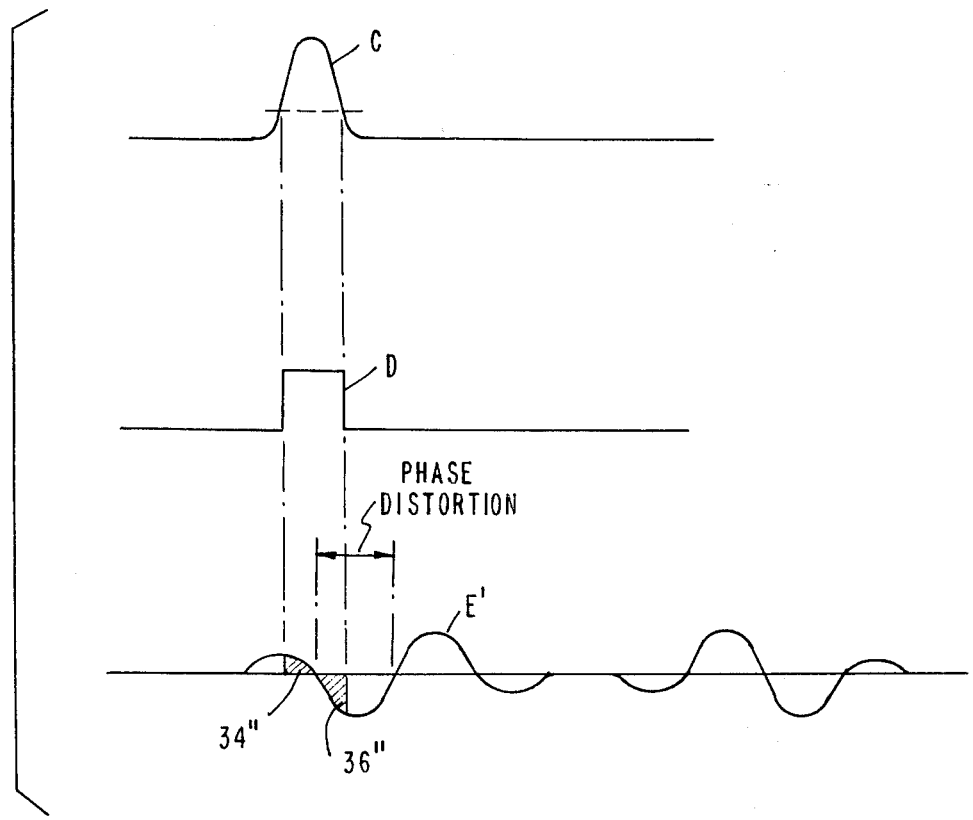
FIG. 8 is a waveform diagram illustrating the subsequent signal processing of a highly phase distorted video signal as performed by the circuitry of FIG. 5.

FIG. 8 illustrates a limitation inherent in the phase distortion detection circuitry illustrated in FIG. 5. It can be seen that since the high frequency waveform E' represents approximately two cycles of a sinusoidal waveform, a further increase in the phase distortion over that which is shown in FIG. 7 will begin to produce positive and negative gated areas 34'', 36'', respectively, such that the gated waveform will integrate to a small or zero net voltage in low pass filter 32 for a large amount of phase distortion. An ambiguity therefore exists as to whether no phase distortion or a very large phase distortion is present. Although the circuitry of FIG. 5 will operate well for most variations of phase distortion, circuitry which avoids such problems associated with very large values of phase distortion is illustrated in FIG. 9.

The circuitry of FIG. 9 is essentially identical to that of FIG. 5, except that rather than directly applying the output of subtractor circuit 30 to analog gate 28, the output of subtractor circuit 30 is applied on the one hand directly to a first input of adder circuit 38 and on the other hand to a second input of adder circuit 38 via delay device 40. Specifically, the output of subtractor circuit 30, representing waveform E or E', is applied to the base of NPN transistor Q4, transistor Q4 having its emitter coupled to ground by way of a resistor, and its collector connected to the collector of NPN transistor Q5, which also has its emitter coupled to ground by way of a resistor. The waveform E or E', delayed by time T' in delay device 40, to produce waveform F or F', is applied to the base of transistor Q5, time T'corresponding to approximately the same delay effected in delay devices 6 and 8, FIG. 1. The common collectors of transistors Q4 and Q5 are applied to the positive supply voltage by way of a resistor. The signals applied to the bases of transistors Q4 and Q5 are added at the common collectors and applied from the common collectors to analog gate 28.

Figure 10:
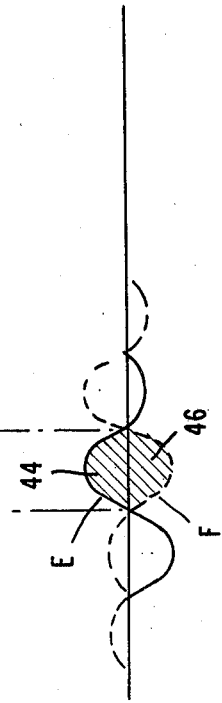
FIG. 10 is a waveform diagram illustrating the subsequent signal processing of the horizontal synchronization pulse performed by the circuitry of FIG. 9 where no phase distortion in the video signal has occurred.

Timing circuitry 42, unlike timing circuitry 26, FIG. 5, produces square wave pulse D, FIGS. 10 and 11, from just after the half-amplitude time for a duration approximately equal to the delay time provided by delay device 40. Timing circuitry 42 may include a combination of well-known one-shot devices designed in a routine manner to provide the above-described square wave pulse D. Pulse D is applied to the control input of gate 28 to thereby pass the output of adder 38 to filter 32 during pulse D.

In FIG. 10, it can be seen that the two signals applied to adder 38, namely voltage 44 due to waveform E from subtractor 30 and voltage 46 due to waveform F from delay device 40, effectively cancel each other out during pulse D, such that low pass filter 32 receives a zero signal voltage, thus indicating that no phase adjustment is necessary.

FIG. 11, on the other hand, illustrates that even a large amount of phase distortion will still produce an error indication since the positive voltage contribution 44' due to waveform F' is significantly less than the negative voltage contribution 46 due to waveform E', thus imparting a net negative voltage on low pass filter 32. Thus, from zero phase distortion to the amount of phase distortion illustrated in FIG. 11, the net negative voltage applied to low pass filter 32 monotonically increases for increasing phase distortion, thereby increasing the range of phase distortion detection over that of the FIG. 5 circuitry.

The manner in which the signal produced by the low pass filter 32 of FIGS. 5 and 9 is applied to control circuitry 12, FIG. 1 will now be described with further reference to FIG. 12. FIG. 12 illustrates the relevant portions of the delay line equalizer and the control circuitry 12 as described in the above-mentioned co-pending patent application. The detailed description of the interconnections found within the control circuitry 12 may be found in the co-pending application with reference to FIG. 6 therein. Transistors Q6–Q11 of FIG. 12, respectively correspond to transistors 42–52 of FIG. 6 of the above-mentioned co-pending application.

The output of low pass filter 32 is applied directly to the base of transistor Q11. It can be seen that the voltages applied to circuits C1 and C3 are proportional to the amount of current flowing through transistors Q8/Q10 and Q7/Q11, respectively. Transistors Q10 and Q11 comprise a doubly balanced switch, such that when the signal applied to the base of transistor Q11 exceeds the reference voltage V2 applied to the base of transistor Q10, transistor Q10 will begin to turn off and transistor Q11 will begin to turn on. As a result, the current through transistors Q8/Q10 decreases and the current through transistors Q7/Q11 increases accordingly. On the other hand, as the signal applied to transistor Q11 falls below V2, the current through transistors Q8/Q10 increases relative to the current through transistors Q7/Q11. It can further be seen that this type of control will produce a phase adjustment in accordance with equation (4), and as illustrated in FIG. 4B. That is, as the control signal to circuit C1 increases, (positive), the control signal to circuit C3 decreases (negative) an equal amount.

The amplitude adjustment signal delivered to the bases of transistors Q6 and Q7 causes control circuitry to vary the current through transistor pairs Q8/Q10 and Q7/Q11 in unison to thereby adjust the amplitude of the video signal, as more fully described in the co-pending application.

The phase distortion detection circuitry described herein thus avoids the difficulties encountered in the extremely complicated detectors employed in the prior art systems and may be used in the distortion reduction circuitry disclosed in the co-pending U.S. patent application Ser. No. 282,039, as an alternative to the phase distortion detection circuitry described therein.

While the preferred embodiments have been described in these specifications. It's understood that a worker skilled in the art could readily understand that many modifications can be made while still carrying out the intent of the invention. The scope of the invention is defined with reference to the following claims.

What is claimed is:

1. A system for detecting and reducing phase distortion in video signals due to multipath effects, comprising means for providing a horizontal synchronization pulse portion of said video signal having a predetermined phase relationship between high and low frequencies contained in said horizontal synchronization pulse portion prior to transission thereof, means for measuring the phase of said high frequencies relative to said low frequencies to thereby provide a correction signal indicative of said phase distortion, and means coupled to receive said correction signal and said video signal for reducing said phase distortion in said video signal in accordance with the correction signal.

2. In a delay line equalizer having an N tap delay line for equalizing phase distortion in video signals due to multipath effects, a system for detecting said phase distortion comprising means for providing a selected portion of said video signal having a predetermined phase relationship between high and low frequencies contained in said selected portion prior to transmission thereof, and means for measuring the phase of said high frequencies relative to said low frequencies to thereby provide an indication of said phase distortion.

3. The equalizer of claim 2, wherein said delay line has no more than three taps.

4. A system for detecting and reducing phase distortion in a video signal due to multipath effects, comprising:

means for providing a horizontal synchronization pulse portion of said video signal having a predetermined relationship between high and low frequencies contained in said horizontal synchronization portion prior to transmission thereof;

means for providing a signal related to the high frequency components of said horizontal synchronization pulse portion;

means for developing timing signals relative to said horizontal synchronization pulse portion;

output means responsive to said signal related to said high frequencies and under the control of said timing signals for providing a correction signal indicative of said phase distortion; and means coupled to receive said correction signal and said video signals for reducing said phase distortion in said video signal in accordance with said correction signal.

5. In a delay line equalizer having an N tap delay line for equalizing phase distortion in video signals due to multipath effects, a system for detecting said phase distortion comprising:

means for providing a selected portion of said video signal having a predetermined phase relationship between high and low frequencies contained in said selected portion prior to transmission thereof;

means for providing a signal related to the high frequency components of said selected portion;

means for developing timing signals relative to said selected portion; and output means responsive to said signal related to said high frequencies and under the control of said timing signals for providing a signal indicative of said phase distortion.

6. The equalizer of claim 5, wherein said delay line has no more than three taps.

7. The system of any one of claims 4, 5 or 6, wherein said output means comprises a gate receiving said signal related to the high frequency components and controlled by said timing signals for producing a gated output signal, and a filter for receiving said gated output signal.

8. The system of claim 7, wherein said means for providing a signal related to the high frequency components comprises means for adding said separated high frequencies to a delayed version thereof to produce said signal related to said separated high frequencies.

9. The system of claim 7, wherein said signal related to said separated high frequencies is identical to said separated high frequencies.

10. The system of any one of claim 4, 5 or 6, wherein said means for developing timing signals includes means for substantially differentiating signals related to said selected portion to provide a differentiated signal.

11. The system of claim 10, wherein said means for developing timing signals further includes timing circuitry for receiving said differentiated signal and for providing precise timing signals to said output means.

12. The system of claim 10, wherein said signal related to said selected portion is identical to said selected portion of said video signal.

13. The system of claim 10 further comprising a low pass filter receiving said selected portion for providing a filtered signal and wherein said signal related to said selected portion is said filtered signal.

14. The system of claim 10 further comprising a delay device receiving said selected portion and providing a delayed replica thereof, and said signal related to said selected portion is said delayed replica.

15. The system of any one of claims 4, 5 or 6, wherein said means for providing a signal related to said high frequency components comprises filter means for low pass filtering said selected portion for providing a filtered signal and subtraction means for subtracting said filtered signal from said selected portion.

16. The system of claim 15, wherein filter means comprises a Gaussian-like low pass filter.

17. The system of claim 16, wherein said selected portion is delayed in a delay device prior to being applied to said subtractor means to thereby compensate for a delay in said low pass filter.

18. The system of any one of claims 2, 3, 5 and 6, wherein said selected portion is a horizontal synchronization pulse portion of said video signal.

19. The system of claim 7, wherein said selected portion is a horizontal synchronization pulse portion of said video signal.

20. The system of claim 10, wherein said selected portion is a horizontal synchronization pulse portion of said video signal.

21. The system of claim 15, wherein said selected portion is a horizontal synchronization pulse portion of said video signal.

22. A system for detecting phase distortion in video signals due to multipath effects, comprising:

means for providing a selected portion of said video signal having a predetermined phase relationship between high and low frequencies contained in said selected portion prior to transmission thereof;

first low pass filter means for filtering said selected portion to provide a filtered version of said selected portion;

delay means for delaying said selected portion an amount approximately equal to the delay in said first low pass filter means to provide a delayed version of said selected portion;

subtractor means for subtracting said filtered version of said selected portion from said delayed version of said selected portion to provide a difference signal;

means for developing timing signals relative to said selected portion;

second low pass filter means having a signal input and a signal output; and gating means receiving said difference signal and said timing signals for delivering said difference signal to said signal input of said second low pass filter under the control of said timing signals, whereby said signal output of said second low pass filter is indicative of phase distortion in said video signal.

23. A system for detecting phase distortion in video signals due to multipath effects, comprising:

means for providing a selected portion of said video signal having a predetermined phase relationship between high and low frequencies contained in said selected portion prior to transmission thereof;

first low pass filter means for filtering said selected portion to provide a filtered version of said selected portion;

first delay means for delaying said selected portion an amount approximately equal to the delay in said first low pass filter means to provide a delayed version of said selected portion;

subtractor means for subtracting said filtered version of said selected portion from said delayed version of said selected portion to provide a difference signal;

second delay means for delaying said difference signal to provide a delayed version of said difference signal;

adder means for adding said difference signal and said delayed version of said difference signal to provide a summation signal;

means for developing timing signals relative to said selected portion;

second low pass filter means having a signal input and a signal output; and gating means receiving said summation signal and said timing signals for delivering said summation signal to said signal input of said second low pass filter under the control of said timing signals, whereby said signal output of said second low pass filter is indicative of phase distortion in said video signal.

* * * * *